United States Patent Office 3,396,538
Patented Aug. 13, 1968

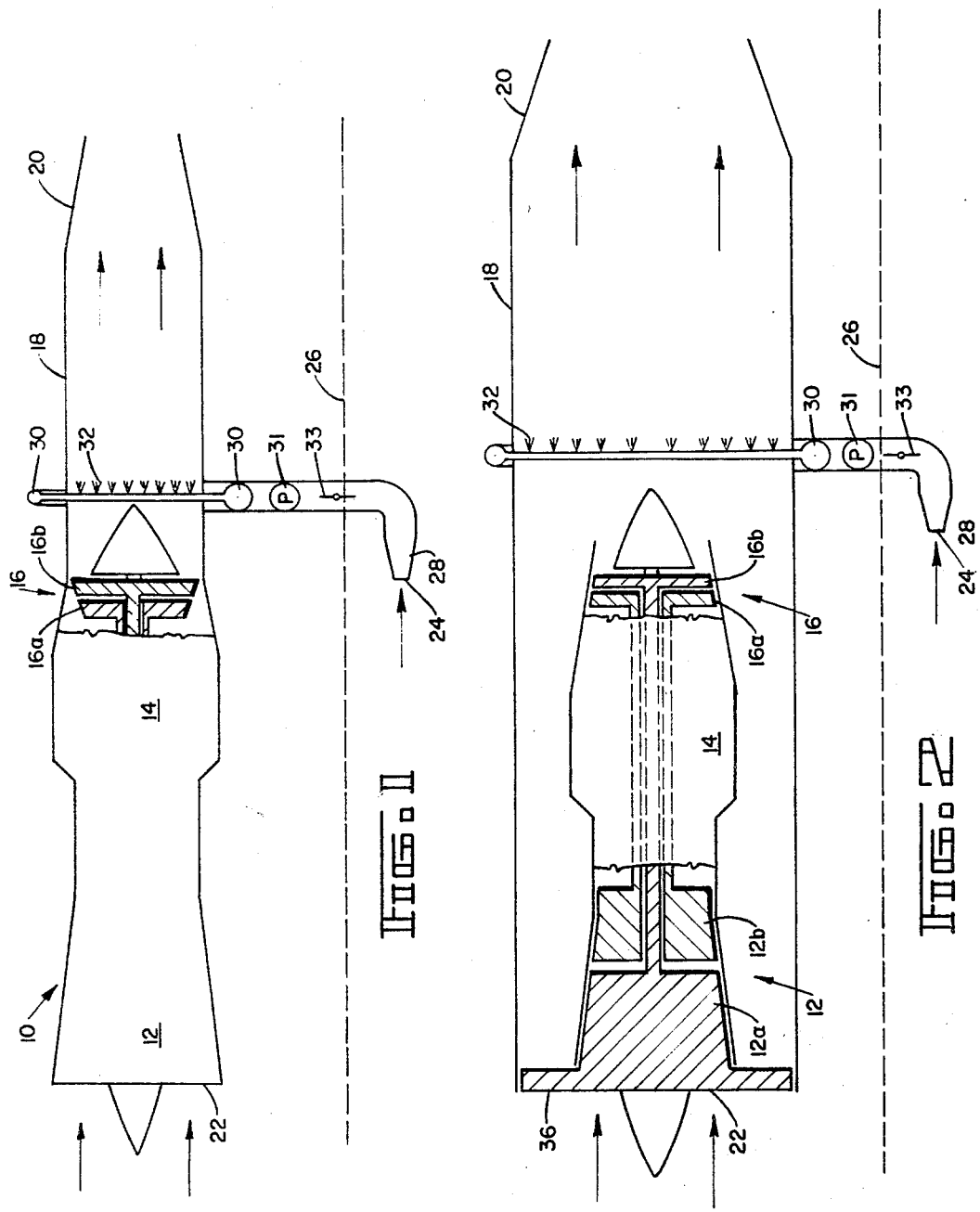

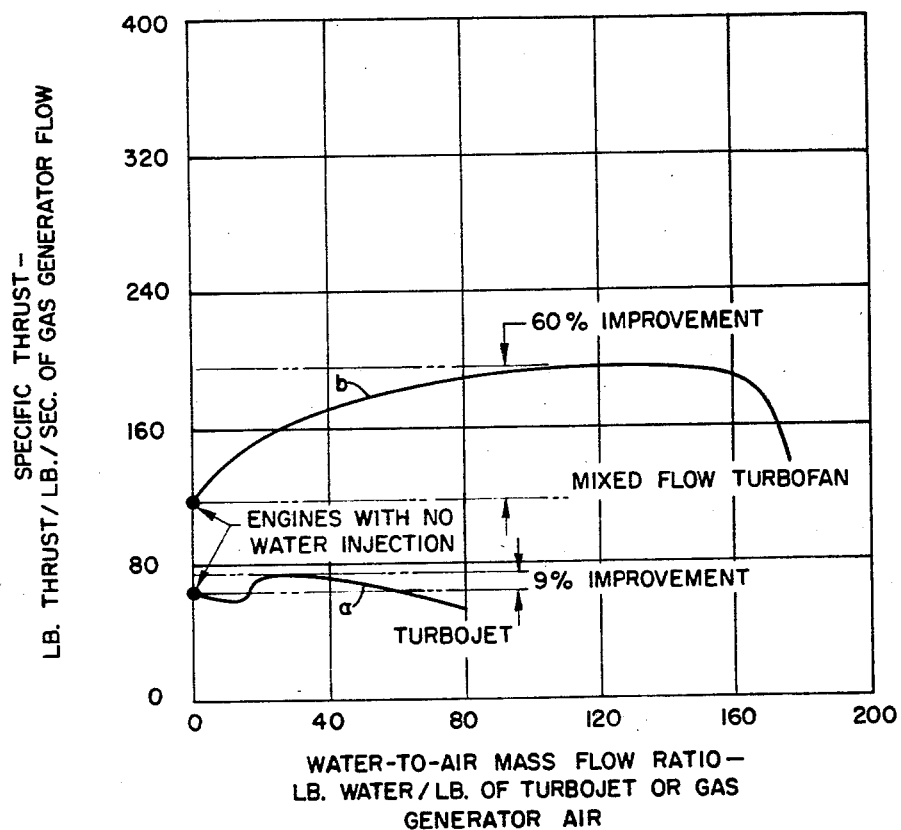

3,396,538
WATER INJECTION FOR THRUST AUGMENTATION
Arthur E. Wetherbee, Jr., Newington, Conn., assignor to United Aircraft Corporation, Hartford, Conn., a corporation of Delaware
Filed Oct. 3, 1966, Ser. No. 583,661
6 Claims. (Cl. 60—263)

ABSTRACT OF THE DISCLOSURE

Gas turbine engine thrust augmentation for marine propulsion wherein large amounts of water are injected in a duct between the turbine discharge area and the jet nozzle.

---

This invention relates to a propulsion system for a marine vehicle. More particularly, this invention relates to a gas turbine engine propulsion system for a marine vehicle wherein water is introduced in the discharge gases of a turbojet engine or a turbofan engine to provide propulsion.

Recently, considerable emphasis has been placed on the selection and design of efficient, lightweight propulsion systems for marine vehicles, such as those of the planing, captured air bubble and hydrofoil types, capable of operating at speeds of up to 100 knots and more. Two schemes which have evolved from recent investigations in this field are the shaft-turbine drive pump jet (see Waterjet Propulsion for Marine Vehicles, AIAA paper No. 65–245, J. Traskel and W. E. Beck, presented at San Diego, Calif., March 1965 and the shaft-turbine drive supercavitating propeller (see Hydrofoil Propulsion System and Design, SNAME paper No. 2–g, J. F. Dunne, presented in Seattle, Wash., May 1965). However, the pump jet and the supercavitating propeller have the serious disadvantage of high weight since the pump jet component and the supercavitating propeller blade and gear box offset the lightweight feature of the shaft-turbine drive.

Although aircraft type turbojet and turbofan engines are relatively light weight systems, they are not directly applicable to marine applications since they are characterized by low propulsive efficiency and high thrust specific fuel consumption in the range of vehicle speeds up to 100 knots. The present invention results in increases in specific thrust and propulsive efficiency and a decrease in thrust specific fuel consumption for aircraft type gas turbine engines of the turbojet and mixed flow turbofan variety to make these aircraft type engines extremely suitable and attractive for marine propulsion systems while retaining the attractive lightweight characteristics of these engines.

As disclosed in the present invention, water, obtained from a body of water in which the marine vehicle is to be propelled, is injected at large rates of flow into the turbine discharge stream of a turbojet engine or into the mixed fan and turbine stream of a mixed flow turbofan engine. The water is injected into and mixed with the exhaust stream prior to the nozzle expansion process. Analyses of a turbojet engine and a mixed flow turbofan engine incorporating the present invention of water injection into the exhaust discharge duct have been performed, and these particular analyses showed a turbojet thrust increase of approximately 9 percent and a mixed flow turbofan engine thrust increase of approximately 60 percent by this water injection. Thus, these analyses have demonstrated the basic concept that the specific thrust and propulsive efficiency of gas turbine turbojet engines and mixed flow turbofan engines can be increased, and the thrust specific fuel consumption of these engines decreased so that use of these lightweight type engines becomes practical for marine propulsion without the need to add supplementary propulsive machinery such as propellers.

A related invention concerning water injection into the bypass duct of a bypass turbofan engine is disclosed and claimed in a United States patent application for Marine Propulsion System by W. R. Davison and C. A. Brown, filed contemporaneously herewith and assigned to the assignee of this application.

Accordingly, one object of the present invention is to provide a novel gas turbine engine propulsion system for marine vehicles.

Another object of the present invention is to provide a novel propulsion system for marine vehicles wherein the propulsion is supplied directly by a turbojet or turbofan engine.

Still another object of the present invention is to provide a novel propulsion system for marine vehicles wherein propulsion is supplied directly by a turbojet engine or a turbofan engine, and wherein water is injected into the exhaust duct of the engine.

Still another object of the present invention is to provide a novel propulsion system for marine veheicles wherein propulsion is supplied directly by a turbojet engine or a mixed flow turbofan engine, and wherein water is injected in large quantities into the discharge passage of the engine to increase engine thrust, increase engine propulsive efficiency, and decrease thrust specific fuel consumption.

Other objects and advantages will be apparent from the following detailed description and drawings.

In the drawings wherein like elements are numbered alike in each figure:

FIGURE 1 is a view, partly in section, of a gas turbine engine of the pure turbojet type incorporating the present invention.

FIGURE 2 is a view, partly in section, of a gas turbine engine of the mixed flow turbofan type incorporating the present invention.

FIGURE 3 is a chart showing improved turbojet and mixed flow turbofan engine performance with water injection according to the present invention.

Referring now to FIGURE 1, a gas turbine engine 10 of the straight turbojet variety is shown. Turbojet engine 10 has the usual compressor section 12, a burner or combustion section 14 and a turbine 16. The present invention will first be described in connection with an engine of the JT–3 type of Pratt and Whitney Aircraft Division of United Aircraft Corporation; thus it will be observed that turbine unit 16 is shown as being comprised of two coaxial units (high pressure turbine 16a and low pressure turbine 16b) for the twin spools of this engine. However, it will also be understood that the present invention is equally applicable to a single spool gas turbine engine and to gas turbine engines in general. Downstream of turbine unit 16 there is a tailpipe unit in the form of a duct 18, and an exhaust nozzle 20 which may be of variable area if desired.

In the standard mode of operation of gas turbine engine 10, air enters an air inlet 22, and is compressed in compressor section 12 to be raised to a higher pressure for use in the engine. The compressed air is then delivered to combustion section 14 where fuel is added and burned to form a high energy engine gas stream. This high energy engine gas stream then flows through the two turbines of turbine unit 16 where some of the energy is extracted to power the turbines for driving the compressors. The engine gas stream then flows through duct 18 as indicated by the arrows and is discharged rearwardly through exhaust nozzle 20 for the generation of forward thrust. The air flow and generation of an exhaust gas stream are in accordance with the basic general operation of the gas turbine engine.

Engine 10 is mounted in any convenient manner on the marine vehicle (not shown) to be propelled, such as a planing boat or a hydrofoil. The direction of forward motion of the marine vehicle to be propelled is opposite to the direction of the air flow arrows indicated in FIGURE 1.

In accordance with the present invention, water is introduced to the system to make the gas turbine engine a more attractive unit for marine propulsion, especially in the speed range up to 1000 knots. Water is induced into the system through a ramscoop 24 submerged below the water line 26 of the body of water in which the vehicle is to be propelled. Ramscoop 24 faces in the direction of forward motion of the vehicle to be propelled. The pressure head of injection water is created by the transformation of the kinetic energy of the water due to the forward velocity of the marine vehicle, and hence the forward velocity of ram water scoop 24. The water captured by ramscoop 24 is diffused in a diffuser 28 and delivered to a water manifold 30. The water is then delivered via an array of spray nozzles 32 to the interior of duct 18, preferably in atomized or droplet form. A pump 31 can be included in the system if desired, but is not necessary. The pump would be particularly useful in supplying water at low vehicle speeds where ram pressure may be insufficient to supply the water.

The water sprayed into duct 18 mixes with the combustion gases normally flowing through duct 18, and the mixture of water and combustion gases is exhausted as a mixed stream through exhaust nozzle 20. Relatively large amounts of water are induced into the system in accordance with the present invention, the water-to-air mass flow ratio for one analyzed situation being preferably in a range from 20/1 to 40/1. In view of the presence of water in the exhaust stream, exhaust nozzle 20 should be larger than normal, and may have to be divergent or convergent-divergent in the event that the exhaust stream is supersonic in relation to the speed of sound in the mixed stream of gas and water.

A valve 33 can be incorporated in the water supply duct to shut off water flow if it is desired to operate the engine without water injection.

Performance characteristics of the water injected turbojet engine of FIGURE 1 have been analyzed and will be discussed hereinafter.

Referring now to FIGURE 2, a gas turbine engine 34 of the mixed flow turbofan type is shown. Similarly to engine 10 of FIGURE 1, mixed flow turbofan 34 has a gas generator comprised of a compressor section 12 (low pressure compressor 12a and high pressure compressor 12b being shown), a burner section 14 and a turbine unit 16. Air enters through air inlet 22 for compression in compressor 12, combustion in burner 14, and expansion through turbine unit 16. In addition to the gas generator comprised of the usual components of a gas turbine engine, mixed flow turbofan 34 has an additional compressor unit or fan 36 which is an extension of or is connected to the low pressure compressor 12a of compressor unit 12 and which is driven by the low pressure turbine of turbine unit 16.

In addition to the airflow in mixed flow turbofan engine 34 through compressor section 12, burner section 14 and turbine unit 16, fan 36 introduces large amounts of compressed but unburned air into the duct 18. Engine 34 is referred to as a mixed flow turbofan because the combustion discharge gases from turbine unit 16 combine with the bypass airflow from fan 36 in a common tailpipe unit or duct 18 and are then discharged rearwardly through a common exhaust nozzle 20. It is contemplated that engine 34 will be a high bypass ratio engine in that the ratio of air flowing through fan 36 to air flowing through the gas generator section will be large, a ratio of 4 to 1 having been selected for an analysis to be presented hereinafter.

As with the system shown in FIGURE 1, water is induced into the engine unit of FIGURE 2 through a submerged ramscoop 24, and the water is delivered via diffuser 28, manifold 30 and spray nozzles 32 into the interior of duct 18. The water sprayed into duct 18 mixes with the combusion gas discharge from gas generator turbine 16 and the bypass airflow from fan 36 to form a single mixture for discharge through exhaust nozzle 20.

The water-to-air mass flow ratio (based on gas generator air flow) for the mixed flow turbofan of FIGURE 2 is contemplated to be even higher than the water-to-air mass flow ratio for the turbojet of FIGURE 1. The water-to-air mass flow ratio (based on gas generator air flow) for one analyzed mixed flow turbofan system ranged up to 180 and was preferably in the range from 80 to 160. As pointed out with respect to the straight turbojet of FIGURE 1, the exhaust nozzle 20 of turbofan 34 should be larger than normal in view of the presence of the water in the exhaust stream, and nozzle 20 may also have to be a divergent or convergent-divergent nozzle in the event that the exhaust stream is supersonic in relation to the speed of sound in the particular mixed stream of water and gas flowing through the nozzle.

Merely by way of example to demonstrate that the water injection concept of the present invention can make aircraft type gas turbine engines of interest in marine propulsion applications, results are presented in FIGURE 3 of an analysis of two engines corresponding to the engines shown in FIGURE 1 and FIGURE 2. In performing the analysis on which FIGURE 3 is based, a Pratt and Whitney Aircraft JT3 type engine was employed as the straight turbojet of FIGURE 1, and it was assumed that the mixed flow turbofan of FIGURE 2 was a JT3 (J57) type engine used as a gas generator with the fan 36 being an add-on unit or extension of the low pressure compressor.

Performance calculations for the water injected engines of FIGURES 1 and 2 were conducted with water-to-air mass flow ratios in the range from zero to 200, the zero ratio corresponding to no water injection. In calculations for both the water injected turbojet of FIGURE 1 and the mixed flow turbofan of FIGURE 2, the water-to-air mass flow ratios were systematically increased until results indicated that further increases would result in a reduction in specific thrust. Engine specific thrust (pounds of thrust per pound per second of turbojet engine gas flow or turbofan gas generator gas flow) for both the turbojet engine of FIGURE 1 and the mixed flow turbofan engine of FIGURE 2 includes losses due to inlet water drag and inlet air drag. In order to compare the performance of both engines on the same bases, system propulsive efficiency was also considered, system propulsive efficiency being defined as the product of the power turbine efficiency and the thrust horsepower divided by the gas horsepower available from the engine (i.e., the gas horsepower generated by the engine minus that used to power the compressors of the turbojet of FIGURE 1 or the compressors, but not the fan, of the FIGURE 2 engine).

The performance calculations employed a 0.70 ram pressure recovery factor, defined as the fraction of the dynamic pressure head created by the forward velocity of the vehicle that is recovered in the water inlet of ramscoop 24.

The calculations were made for a marine vehicle speed of 50 knots, a single water injection velocity was considered for each engine regardless of water-to-air mass flow ratios and thermal equilibrium was assumed in duct 18.

As seen in FIGURE 3, the analysed performance of the straight turbojet engine with exhaust duct water injection used to propel a 50 knot marine vehicle is presented in line $a$ as a function of water-to-air mass flow ratio vesus specific thrust. As indicated, the starting point on line $a$ corresponds to a condition of no water injection. It can be seen that the results indicate that increases in water-to-air mass flow ratio for the straight turbojet engine result in an initial decrease in specific thrust, then an increase in specific thrust to a maximum, and then a gradual decrease. The initial indicated decrease in specific thrust is due to the stringent assumption that thermal equilibrium will occur in duct 18 so that the hot exhaust gases in the straight turbojet engine vaporize a large portion of the injected water with the result that this latent heat of evaporation is unavailable for expansion in the exhaust nozzle. However, as the water-to-air mass flow ratio is increased, the larger water flow rate results in the evaporation of a smaller fraction of the total water injected, and therefore the thrust increases. It should be borne in mind that the assumption of thermal equilibrium assumes the most stringent possible condition, and one which will not be completely present in practice. Thus, actual performance improvement with water injection is expected to be better than indicated by line $a$.

The highest specific thrust indicated by line $a$ is about 70 lbs./lbs./sec. which is about 9 percent higher than the specific thrust for this engine without the water injection.

Both the maximum specific thrust indicated by line $a$ and the corresponding propulsive efficiency are higher than would otherwise be obtained with the engine without water injection. Thus, line $a$ demonstrates the basic concept that performance of a gas turbine engine can be improved by water injection in accordance with this invention to make the engine more suitable for marine vehicle propulsion than previous engines of this type.

Line $b$ in FIGURE 3 shows engine performance for water injection in accordance with the present invention in the mixed flow turbofan engine of FIGURE 2. The significant increases in specific thrust shown by line $b$ indicate that the mixed flow turbofan engine of FIGURE 2 would be an attractive gas turbine engine installation for marine vehicle propulsion. As the water-to-air mass flow ratio (based on gas generator air) is increased from 0 toward 200, line $b$ shows that the specific thrust of the mixed flow turbofan engine constantly increases to a relatively level maximum of about 195 lbs./lbs./sec. which corresponds to a propulsive efficiency of approximately 23 percent. This maximum specific thrust level with water injection corresponds to an augmentation of about 60 percent in engine thrust over the thrust available without water injection.

It can be seen that the specific thrust of the mixed flow turbofan engine as represented by line $b$ is always greater than the specific thrust of the straight turbojet engine as represented by line $a$. Two primary factors combine to produce this result. First, the net specific thrust of the basic turbofan engine without water injection is greater than the net specific thrust of the turbojet engine without water injection. Second, the temperature of the mixed flow turbofan exhaust stream is lower than that of a straight turbojet because of the addition of the relatively cooler fan air stream to the main gas generator air stream. This lower temperature of the mixed flow turbofan exhaust stream results in less of the injected water being evaporated in the engine exhaust duct, and therefore, additional energy (the energy not required for evaporation) will be available for additional propulsive action.

While preferred embodiments have been shown and described, various modifications and substitutions may be made without departing from the spirit and scope of this invention. Accordingly, it is to be understood that this invention has been described by way of illustration rather than limitation.

What is claimed is:
1. A propulsion system for propelling a marine vehicle through water including:
   a gas turbine engine mounted on the vehicle to be propelled, said gas turbine engine having air intake means for the intake of air for a propulsive stream and exhaust nozzle means for the discharge of a propulsive stream;
   duct means for delivering said propulsive stream to said exhaust nozzle means;
   water intake means for inducting water into the propulsion system, the mass of water inducted into the propulsion system being at least 20 times the mass of air taken into the propulsion system; and
   water delivery means connected between said water intake means and said duct means for delivering water to said duct means for mixing with a gas stream in said gas turbine engine prior to delivery to said exhaust nozzle means to produce a mixed propulsive stream of gas and water for thrust generation.
2. A propulsion system as in claim 1 wherein:
   said delivery means includes injection nozzle means, said injection nozzle means delivering water to said duct means in a spray.
3. A propulsion system as in claim 2 wherein:
   said delivery means includes manifold means connected to receive water from said intake means and deliver water to said injection nozzle means.
4. A propulsion system as in claim 1 wherein said delivery means includes pump means for pumping water from said intake means to said duct means.
5. A propulsion system as in claim 1 wherein:
   said gas turbine engine is a turbojet engine; and
   wherein said duct means receives the gas discharge stream from the turbine of said gas turbine engine.
6. A propulsion system as in claim 1 wherein:
   said gas turbine engine is a turbofan engine; and wherein
   said duct means is positioned to receive the discharge from the fan of said turbofan engine and the discharge from the turbine of said gas turbine to deliver a mixed stream of turbine discharge gas, fan air and water to said exhaust nozzle means.

References Cited
UNITED STATES PATENTS

| | | | |
|---|---|---|---|
| 2,551,229 | 5/1951 | Alford et al. | 60—264 |
| 2,648,196 | 8/1953 | Mullen et al. | 60—39.55 |
| 2,866,313 | 12/1958 | Holl | 60—39.55 XR |
| 2,987,873 | 6/1961 | Fox | 60—262 XR |
| 3,327,480 | 6/1967 | Gunter | 60—264 XR |

FOREIGN PATENTS

| | | |
|---|---|---|
| 920,205 | 11/1954 | Germany. |
| 746,377 | 3/1956 | Great Britain. |

CARLTON R. CROYLE, *Primary Examiner.*

UNITED STATES PATENT OFFICE
CERTIFICATE OF CORRECTION

Patent No. 3,396,538                                                August 13, 1968

Arthur E. Wetherbee, Jr.

It is certified that error appears in the above identified patent and that said Letters Patent are hereby corrected as shown below:

Column 1, line 34, "1965" should read -- 1965) --. Column 2, line 25, "veheicles" should read -- vehicles --. Column 3, line 13, "1000" should read -- 100 --; same column 3, lines 13 and 34, and column 4, lines 3 and 4, "induced", each occurrence, should read -- inducted --.

Signed and sealed this 16th day of December 1969.

(SEAL)
Attest:

Edward M. Fletcher, Jr.                          WILLIAM E. SCHUYLER, JR.
Attesting Officer                                         Commissioner of Patents